United States Patent
Collings et al.

(10) Patent No.: US 8,654,048 B2
(45) Date of Patent: Feb. 18, 2014

(54) APPARATUS AND METHOD FOR DISPLAYING A VIDEO IMAGE

(75) Inventors: Neil Collings, Linton (GB); Timothy Wilkinson, Cambridge (GB); William Crossland, Harlow (GB); Edward Buckley, Cambridge (GB); Adrian Cable, Cambridge (GB); Nicholas Lawrence, Cambridge (GB); Peter Mash, Colorado Springs, CO (US)

(73) Assignee: Cambridge Enterprise Limited, Cambridge, Cambridgeshire (GB)

( * ) Notice: Subject to any disclaimer, the term of this patent is extended or adjusted under 35 U.S.C. 154(b) by 689 days.

(21) Appl. No.: 11/453,332

(22) Filed: Jun. 14, 2006

(65) Prior Publication Data
US 2007/0024999 A1   Feb. 1, 2007

Related U.S. Application Data

(63) Continuation of application No. PCT/GB2004/005257, filed on Dec. 15, 2004.

(30) Foreign Application Priority Data

Dec. 15, 2003 (GB) ..................... 0329012

(51) Int. Cl.
*G09G 3/36* (2006.01)
*G09G 3/18* (2006.01)
*G02F 1/1335* (2006.01)
*G03H 1/08* (2006.01)
*G02B 5/32* (2006.01)

(52) U.S. Cl.
USPC ............... 345/87; 345/38; 345/51; 349/57; 349/67; 359/9; 359/15

(58) Field of Classification Search
USPC ........... 345/87, 38, 50–51; 349/57, 67; 359/9, 359/15
See application file for complete search history.

(56) References Cited

U.S. PATENT DOCUMENTS

| 4,588,260 | A | * | 5/1986 | Horner ........................... 359/29 |
| 5,546,198 | A | | 8/1996 | van der Gracht et al. |
| 5,589,955 | A | | 12/1996 | Amako et al. |
| 6,011,874 | A | | 1/2000 | Glückstad |

(Continued)

FOREIGN PATENT DOCUMENTS

| KR | 10-2002-0069878 | 9/2002 |
| WO | WO 00/75698 A1 | 12/2000 |

(Continued)

OTHER PUBLICATIONS

Bauchert, K., et al., "Advances in Liquid Crystal Spatial Light Modulators," *Proc. of SPIE*, 4734:35-43 (2002).

(Continued)

*Primary Examiner* — Amr Awad
*Assistant Examiner* — Andre Matthews
(74) *Attorney, Agent, or Firm* — Hamilton, Brook, Smith & Reynolds, P.C.

(57) ABSTRACT

A method of displaying a video image comprises receiving sequential image frames at a processor. Each image frame is processed to obtain a kinoform. A programmable diffractive element such as an SLM represents the sequence of kinoforms allowing reproduction of the image using a suitable illumination beam.

46 Claims, 6 Drawing Sheets

(56) References Cited

U.S. PATENT DOCUMENTS

| | | | |
|---|---|---|---|
| 6,195,184 B1 | | 2/2001 | Chao et al. |
| 6,437,919 B1 | * | 8/2002 | Brown et al. ............... 359/621 |
| 6,456,421 B1 | * | 9/2002 | Chapnik et al. ............. 359/292 |
| 6,456,760 B1 | | 9/2002 | Kurokawa et al. |
| 6,688,746 B2 | | 2/2004 | Malov |
| 6,975,786 B1 | * | 12/2005 | Warr et al. ................... 385/17 |
| 8,072,488 B2 | | 12/2011 | Cable et al. |
| 2001/0050787 A1 | * | 12/2001 | Crossland et al. ............ 359/15 |
| 2002/0190922 A1 | * | 12/2002 | Tsao ............................ 345/32 |
| 2003/0161042 A1 | | 8/2003 | Long |
| 2006/0268241 A1 | | 11/2006 | Watson et al. |
| 2012/0105580 A1 | | 5/2012 | Cable et al. |

FOREIGN PATENT DOCUMENTS

| | | |
|---|---|---|
| WO | WO 03/025680 A1 | 3/2003 |
| WO | WO 2005/059659 A2 | 6/2005 |
| WO | WO 2005/059660 A2 | 6/2005 |
| WO | WO 2005/059881 A2 | 6/2005 |

OTHER PUBLICATIONS

Horikoshi, T., et al., "Time-Sharing Display Approach Using Liquid Crystal Light Valve and a Photorefractive Crystal for Electroholography," *SPIE*, 3637:64-70 (1999).

Huebschman, M.L., et al., "Dynamic Holographic 3-D Image Projection," *Optics Express*, 11(5):437-445 (2003).

Mu, R., et al., "Transmissive Kinoform Fabricated by Use of Binary Optical Technique," *Proc. of SPIE*, 4929:494-498 (2002).

Sato, K., "Characteristics of Kinoform by LCD and Its Application to Display the Animated Color 3D Image," *SPIE*, 2176:42-49 (1994).

Krueger, S., et al., "Liquid Crystal Display as Dynamic Diffractive Element," *Proc. SPIE*, 4294: 84-91 (2001).

"Development of Computer-Generated Hologram Technique," *Optics 2001*, vol. 30, No. 3, pp. 156-166, (No translation provided).

Kato, M., "Speckle Reduction in Holography," *Optics 1975*, vol. 4, No. 6, pp. 263-277, (No translation provided).

English Language Translation of Official Action for Application No. 2006-544545, date mailed: Jan. 7, 2011, which satisfies the "concise explanation" requirement (for non-English references) for references C18 and C19 under 37 CFR 1.98(a)(3), 2 pages.

Fienup, J.R., "Phase Retrieval Algorithms: A Comparison," *Applied Optics*, 21(15):2758-2769 (1982).

Gerchberg, R.W., et al., "A Practical Algorithm for the Determination of Phase from Image and Diffraction Plane Pictures," *OPTIK*, 35(2):237-246 (1972).

Amako, J., and Sonehara, T., "Kinoform using an electrically controlled birefringent liquid-crystal spatial light modulator," *Applied Optics*, 30(32): 4622-4628 (1991).

Ambs, P., et al., "Dynamic Diffractive Optical Elements displayed on Spatial Light Modulators," *Proceedings of SPIE*, 5477: 293-303 (2004).

Ambs, P., et al., "Image Reconstruction using Electrooptic Holography," *LEOS*, 1: 179-180 (2003).

Bigué, L., and Ambs, P., "Diffractive optical elements displayed on a ferroelectric gray-scale spatial light modulator." Paper presented at Diffractive Optics and Micro Optics, Tucson, Arizona (Jun. 2002).

Ferri, L. C., "Visualization of 3D information with digital holography using laser printers," *Computers & Graphics*, 25: 309-321 (2001).

Wilkinson, T. D., et al., "Dynamic asymmetric binary holograms using a ferroelectric liquid crystal spatial light modulator," *Optics Communications*, 109: 222-226 (1994).

Final Office Action from U.S. Appl. No. 13/283,301, mailed Feb. 19, 2013.

Reply from U.S. Appl. No. 13/283,301, filed Aug. 12, 2013.

Amako, J., et al., "Speckle-Noise Reduction on Kinoform Reconstruction Using a Phase-Only Spatial Light Modulator," *Applied Optics*, 34(17):3165-3171 (1995).

Ambs, P., et al., "Image Reconstruction Using Electrooptic Holography," *LEOS* 1:179-180 (2003).

Ambs, P., et al., "Dynamic Diffractive Optical Elements Displayed on Spatial Light Modulators," *Sixth International Conference on Correlation Optics, Proceedings of SPIE*, 5477:293-303 (2004) (month of publication not available).

Ferri, Lucilla Croce, et al., "Visualization of 3D information with Digital Holography Using Laser Printers," Computers & Graphics, 25:309-321 (2001).

Mu, Renwang, et al., "Transmissive Kinoform Fabricated Use of Binary Optical Technique," *Optical Information Processing Technology, Proceedings of the SPIE*, 4929:494-498 (2002) (month of publication not available).

Wilkinson, T.D., et al., "Dynamic Asymmetric Binary Holograms Using a Ferroelectric LZiquid Crystal Spatial Light Modulator," *Optics Communications* 109:222-226 (1994).

International Search Report issued in PCT Application No. PCT/GB2004/005257, date of mailing Aug. 3, 2005.

Office Action issued in U.S. Appl. No. 13/283,301; Date of Mailing Sep. 16, 2013.

* cited by examiner

APPARATUS AND METHOD FOR DISPLAYING A VIDEO IMAGE

RELATED APPLICATIONS

This application is a continuation of International Application No. PCT/GB2004/005257, which designated the United States and was filed Dec. 15, 2004, published in English, which claims priority to Great Britain Application No. 0329012.9 GB filed Dec. 15, 2003. The entire teachings of the above applications are incorporated herein by reference.

The invention relates to an apparatus and method for displaying a video image, for example using holographic techniques.

Various arrangements are known for displaying images using holography, for example using computer generated holograms (CGH). One such known arrangement is described in U.S. Pat. No. 6,437,919 in which an electronically addressable spatial light modulator (SLM) is addressed to provide a 3D holographic representation of an image. As a result when the SLM is illuminated by an appropriate illumination source the image is reconstructed in the replay field (RPF).

A problem with existing projection displays such as holographic displays is that light efficiency is low, and 3D displays require a large number of pixels.

Furthermore, holographically generated 2D video images are known to possess significant advantages over their conventionally projected counterparts, especially in terms of definition and efficiency. However, the computational complexity of the current hologram generation algorithms preclude their use in real-time applications. Furthermore, even if the existing algorithms were fast enough, the images generated by them are not of sufficient quality for use in a display application.

The invention is set out in the claims.

Because of the use of kinoforms programmable onto a programmable diffractive element such as an LCOS (Liquid crystal over silicon) device configured for phase only modulation, the efficiency of the display is significantly increased compared to existing systems which rely on amplitude modulation of an illuminating beam. As a result real time video with minimal light loss may be achieved. In addition the invention may provide improved noise mitigation techniques by time multiplexing multiple iterations of kinoforms generated during an optimization algorithm.

Furthermore, reconstructed kinoform images possess significant advantages over their conventionally projected counterparts, especially in terms of efficiency and robustness to pixel loss, in conjunction with a device to display the kinoform dynamically at video frame rates and hardware for computing the necessary phase distributions in real time.

In the case of kinoforms electronically written onto an LCOS device, it will be appreciated that the term kinoform embraces any phase distribution representative of a phase hologram, where only the phase modulation of an object wavefront is calculated. For ease of expression the term "kinoform" and "hologram" are used interchangeably in the present description. Reference to video is not limited to data representing any particular type of image content and includes data that is representative of one or more still images, wherein the data are periodically or regularly refreshed.

Embodiments of the invention will now be described with reference to the drawings, of which:

In the following description like reference numerals refer to like parts between respective figures.

In overview this application concerns an equipment for projecting video images from computer generated phase-only holograms (commonly known as a kinoforms). The kinoforms must be capable of being rapidly reconfigured, so they are presented on pixelated liquid crystal over silicon (LCOS) spatial light modulators that have been constructed to operate efficiently as phase-only modulators. The LCOS phase-only SLM is illuminated by a suitably expanded beam from a partially coherent light source (such as a laser or super luminescent light emitting diode, LED) and the phase-only kinoform is converted to a real intensity image in the far field. The far field may be brought nearer using a projection lens to carry out this Fourier transformation. The video frames or subframes that make up the video images are converted into kinoforms by computing their Fourier transform at high speed by using hardware based fast processors (eg FFT, FPGA, and DS processors) and by (for example) using methods related to the Gerchberg-Saxton algorithm. for phase retrieval (reference J. R. Fienup, "Phase retrieval algorithms: a comparison" Applied Optics vol 21 (15) pp. 2758-2765 (1982) and R. W. Gerchberg and W. O. Saxton "A practical algorithm for the determination of phase from image and diffraction plane figures" *Optik* 35 pp. 237-246 (1971), both of which are incorporated herein by reference.

Figure 1:
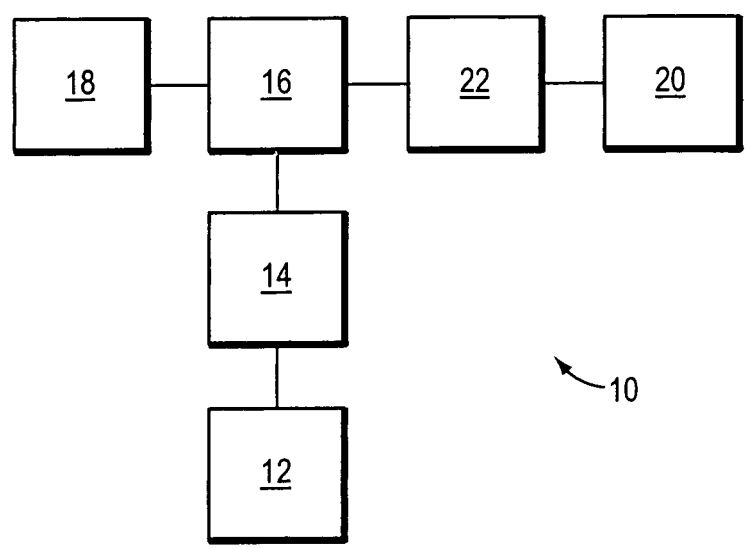
FIG. 1 is a block diagram showing an architecture of a display according to the present invention.

Referring to FIG. 1, a video display comprises a holographic video projector designated generally 10. An object 12 comprising a video image to be projected is received by a processor 14 and processed to form a kinoform on a programmable diffractive element 16 for example a spatial light modulator. The kinoform 16 is illuminated by an illumination source 18 to form an image 20. Optics 22 are provided between the kinoform 16 and image 20 for projecting the replay on a screen as well as, for example for removing zero order effects or mitigating noise in the image.

The kinoform to be generated in the processor 14 and programmed for representation by the SLM 16 comprises a representation of a phase hologram for example of the type described in L. B. Lesem, P. M. Hirsch, J. A. Jordan, "The kinoform: a new wavefront reconstruction device", IBM J. Res. Devel. pp. 150-5 (March, 1969). As this technique relies on phase only modulation there is no light loss through amplitude modulation. Furthermore the SLM is diffractive rather than imaging. The processing steps include generation of the kinoform, encoding of the kinoform into the SLM and noise mitigation steps as described in more detail below. As a result a high quality, high spatial and temporal resolution projection of complex time varying images, or rapidly refreshing images, is provided.

Figure 2:
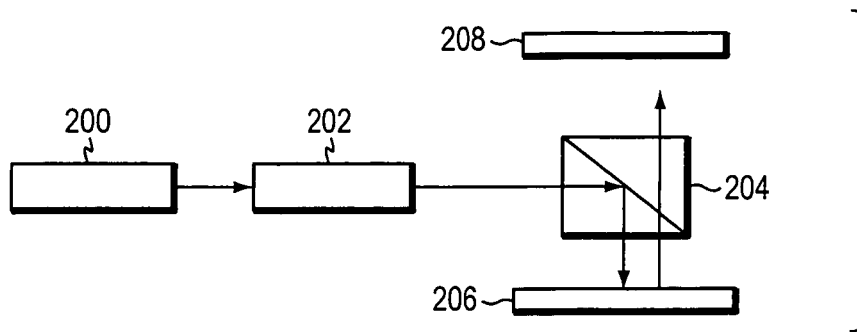
FIG. 2 shows schematically the components of a first embodiment of the invention.

FIGS. 2 to 5 show a single stage architecture according to first to fourth embodiments of the invention. FIG. 2 shows various of the components of the block diagram of FIG. 1 in more detail. For example the illuminating optics comprise a laser 200 together with a beam expander 202. The programmable diffractive element comprises an SLM 206 projecting onto a screen 208. An intermediate optical element comprising a polarising beam splitter 204 is provided in reflection/transmission mode, reflecting the illuminating beam onto the SLM 206 which in turn reflects via its mirror the modulated beam onto screen 208. It will be appreciated that the individual components can be any appropriate component and, for example, the laser, beam expander, and polarising beam splitter can be selected according to the optical requirements of the system. Conventional LCOS devices are suitable for the SLM when modified for phase-only modulation for example as supplied by Holoeye and CRLO Displays. Such modification may comprise binary phase using ferroelectric liquid crystal LCoS devices for phase modulation with ideal switching angle increasing from 45 degrees to 90 degrees for phase modulation. In that case no polarisers or analysers are required. Alternatively, high speed analogue LCoS devices can be introduced using liquid crystal electro-optic effects in which the optic axis rotates in the plane of the liquid crystal layer e.g. electroclinic effect, V-shape switching or the flexoelectric effect in nematic liquid crystals. In all these cases the ideal switching angle is also 45 degrees, which is approximated by integrating a quarter wave plate (QWP) over the mirrors of the LCoS device (not shown). The combination of the mirror and the QWP double the effective switching angle and enables electro-optic effects with switching angles near to 45 degrees to be used. An alternative implementation is LCoS devices with an analogue response to the pixel voltage using nematic liquid crystals. These differ from conventional nematic LCoS devices of this type that are used for intensity only projection. The configuration of the liquid crystal may be modified to give a better analogue phase response and the arrangement of the LCoS device relative to the polarisation state of the incoming device is changed. In that case, no analyser is required for phase-only projection. Manufacture of LCoS devices is further described in "The resurgence of LCOS displays" by H. C. Stauss in *Information Display* (November, 2004; vol. 20(11) pp. 16-20).

Figure 8:
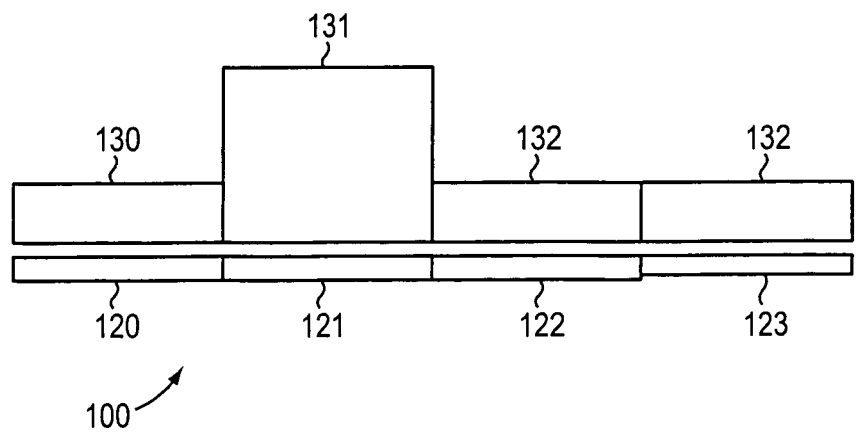
FIG. 8 shows a partial cross-sectional view through an SLM.

Referring to FIG. 8, a cross-sectional view through a part of one embodiment of a binary SLM (100) is shown. The SLM (100) has plural pixels (120-123) in the drawing although it will be understood that the pixels are in fact arranged in a two dimensional matrix. Each pixel (120-123) is capable of being electrically controlled so as to provide a phase shift of 0 or π. Each pixel (120-123) of the SLM has a respective phase-mask pixel (130-133) overlying it and disposed in correspondence with it. As will be seen in the Figure the first, third and fourth phase mask pixels (130, 132, 133) have a relatively low thickness whereas the second phase mask pixel (131) has a relatively high thickness. The thickness difference is selected on the basis of the material of the phase mask and on the basis of the wavelength of the light used. The selection is such that the light passing through the thicker pixels (131) is subject to a phase shift of π more than the light passing through the thinner pixels (130,132,133).

Where the SLM or like device is reflective, the light will pass twice through the phase mask, and corresponding changes in thickness will be needed.

In the present embodiment the phase mask is formed as a coating on the SLM (100). It would of course be possible to use other arrangements for example use two substantially identical SLMs with one providing a data display and the other forming the phase mask.

A particular advantage of the arrangement shown in FIG. 2 is that, because of the use of phase distributions in the form of a kinoform, some or all of the projection optics can be incorporated into the kinoform on the LCOS device as a quadratic phase term for low-cost systems such as a micro-projector providing a Fresnel on-axis hologram.

Figure 3:
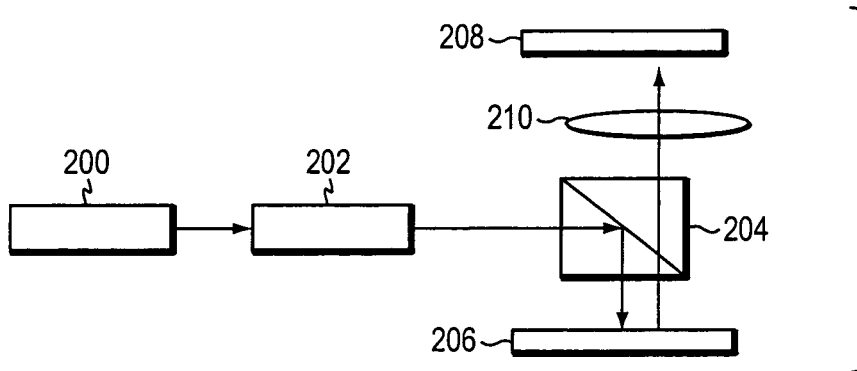
FIG. 3 shows schematically the components of a second embodiment of the invention.

Referring to FIG. 3, an alternative embodiment using a Fraunhofer (or Fourier) hologram is shown in which an additional lens 210 is incorporated providing projection optics.

Figure 4:
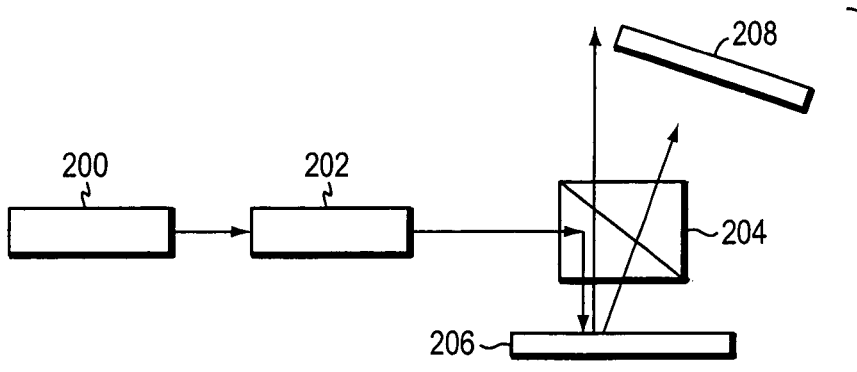
FIG. 4 shows schematically the components of a third embodiment of the invention.
Figure 5:
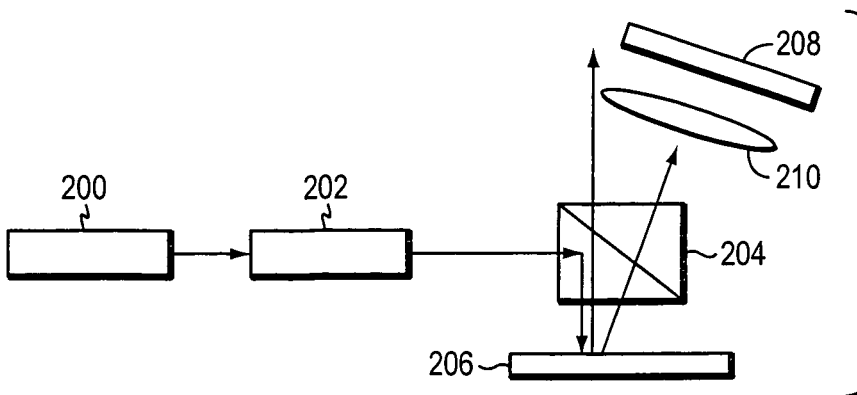
FIG. 5 shows schematically the components of a fourth embodiment of the invention.

In order to remove the zero order spot in the hologram, which is a major noise source in the projection, if a linear phase term is added to the hologram then a Fresnel or Fraunhofer off-axis arrangement can be adopted as shown in FIGS. 4 and 5 respectively in which the screen 208 and, as appropriate, projection optics 210 are provided off-axis hence losing the zero order spot.

Figure 6:
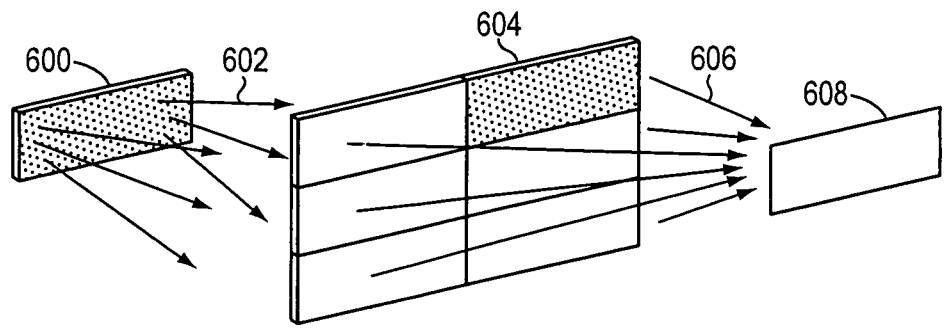
FIG. 6 shows schematically the components of a fifth embodiment of the invention.
Figure 7:
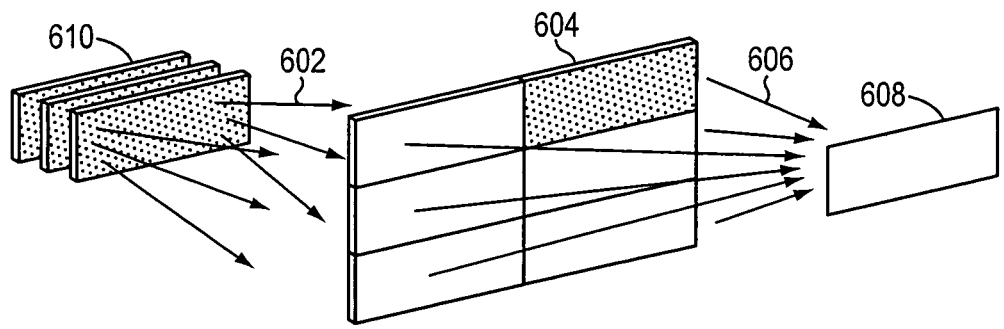
FIG. 7 shows schematically the components of a sixth embodiment of the invention.

Referring to FIGS. 6 and 7 two-stage structures are shown in fifth and sixth embodiments. According to these structures additional intermediate optics comprise an optically addressable spatial light modulator (OASLM) providing additional noise mitigation.

Referring firstly to FIG. 6, a kinoform is represented on an SLM 600 and is multiplexed onto an OASLM 604 via replication optics 602. As a result, multiple versions of the same or different phase hologram are spatially multiplexed on the OASLM, and these are projected via transform projection optics onto a screen 608 according to a scheme used for amplitude holograms as described in U.S. Pat. No. 6,437,919, the contents of which are fully incorporated herein by reference.

The spot size of the projected image is inversely proportional to the aperture of the illumination beam and proportional to the effective focal length of the Fourier projection system. The small aperture provided by conventional SLMs such as LCOS (12-32 mm diagonal) is increased by the spatial multiplexing of the image onto a larger OASLM. As a result existing SLMs can be used without modification, because high quality modulated images are ideal for optically writing on the OASLM photo sensor in real time. Diffractive loss from the large number of pixels on the SLM is reduced by multiplexing the image onto contiguous tiles on the OASLM which hence effectively amplifies the first order diffracted by the SLM. The spot size of the projected image is made smaller by the resulting larger optical aperture of the system and in addition the structure of the OASLM is well suited to this implementation because of the absence of fine pixellation which would otherwise produce diffractive loss into higher orders and because the structure is appropriate for driving ferro-electric liquid crystals giving robust phase modulation as described in reference S. Mias, I. G. Manolis, N. Collings, T. D. Wilkinson, and W. A. Crossland, "Phase-modulating bistable optically addressed spatial light modulators using wide-switching-angle ferroelectric liquid crystal layer" Optical Engineering vol 44 (1) (2005) incorporated herein by reference. As a result a high contrast image is provided.

FIG. 7 shows an alternative two-stage structure in which multiple bit frames of SLM 610 provide multilevel holograms for spatial multiplexing on the OASLM for example respective decompositions of the kinoform by colour, grey scale or otherwise as described in more detail below, which are then combined to provide a final image.

Encoding Kinoforms: Binary and Multilevel Kinoforms.

It will be appreciated that the replication and transform projection optics can be of any appropriate type, for example the transform projection optics can be a Fourier Transform lens. Similarly the OASLM can be of any appropriate type, for example as described in S. Mias et al Opt Eng January 2005 incorporated herein by reference.

Figure 9A:
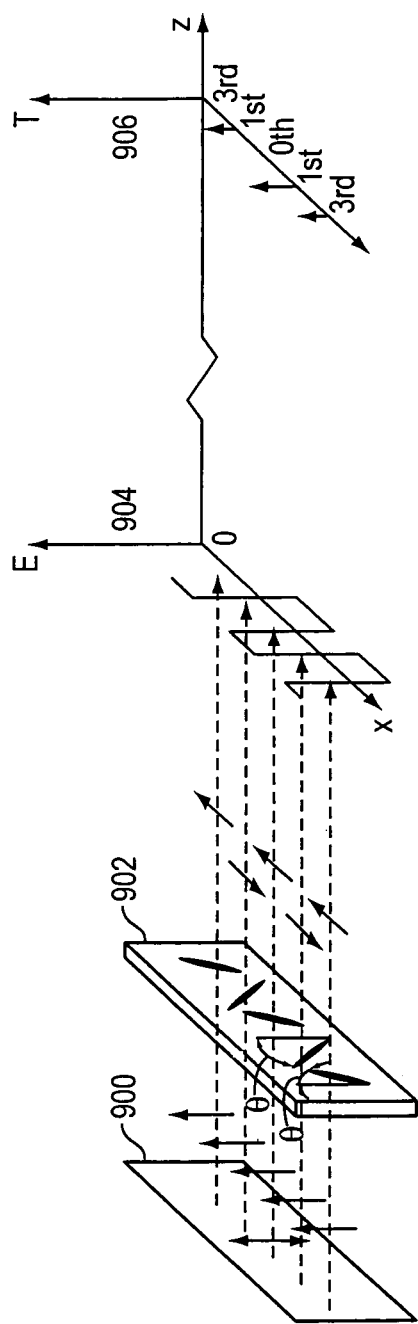
FIGS. 9a and 9b are a respective view of an SLM showing alternative binary phase modulation schemes.

It will be appreciated that any appropriate encoding scheme can be adopted, for example binary or multi-level quantisation. According to the binary scheme shown in FIG. 9a, an SLM 900 includes a plurality of pixels or switching elements 902 with a full switching angle θ=90°. As a result of the quarter wave thickness of the LCOS device, no zero order spot is formed in the far field 906.

Figure 9B:
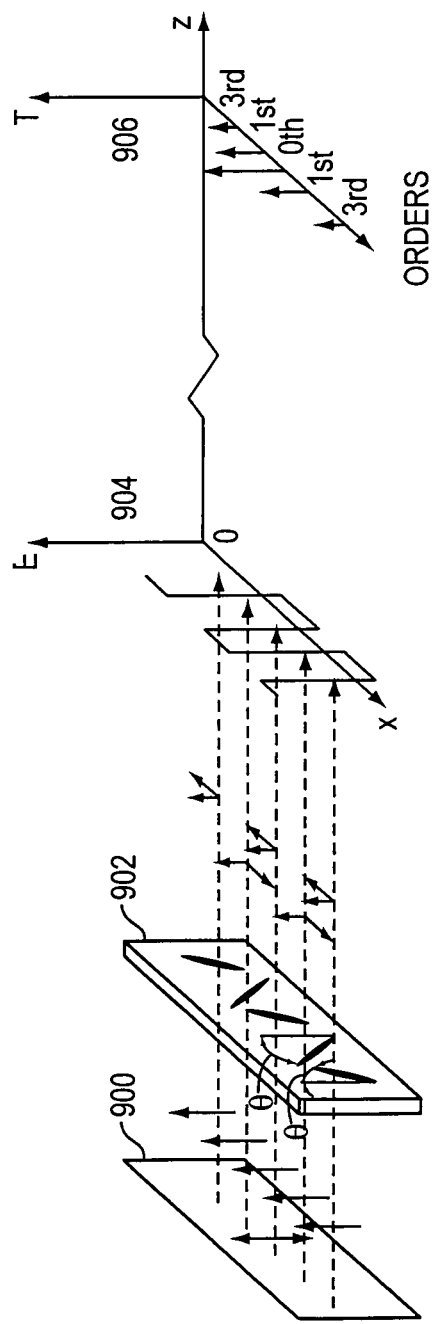

An alternative SLM comprising an LCOS device is shown in FIG. 9b in which the SLM 900 includes a switching element 902 having a full switching angle less than 90°. Accordingly as can be seen from the graph showing symmetrical distribution of $E_{out}$ 904, in the far field 906 a zero order spot is formed as a result of which, for example, the off-axis technique described with reference to FIGS. 4 and 5 can be implemented.

In an alternative encoding/quantisation scheme, further advantages can be achieved over binary phase devices (see below). According to this alternative embodiment multi-level quantisation is adopted in which case more of the light is directed to the desired image. Devices which provide multi-level quantisation include zero twist nematic LCOS devices with positive dielectric anisotropy (E Hallstig, T Martin, L Sjoqvist, M Lindgren, "Polarisation properties of nematic liquid crystal spatial light modulators for phase modulation". Jnl. Opt. Soc. Am. A., August 2004). Pi-cell nematic liquid devices might also be used, as might vertically aligned nematic liquid crystal devices and two frequency nematic devices (K. Bauchert, S. Serati, A. Furman, "Dual frequency nematic SLMs for phase modulation", Proc SPIE 4734 35-43 (2002)). Smectic liquid devices that may have faster switching speeds that may be used include electroclinic LCOS, deformed helix LCOS, tandem binary LCOS and V-shaped switching LCOS M. O'Callaghan, "Switching dynamics and surface forces in thresholdless V-shaped switching ferroelectric liquid crystals" Phys Rev. E67, 011710 (2003). The primary advantage of using multiple levels of phase is that the kinoform is capable of directing all the light into one diffracted order as opposed to the equal distribution of intensities into plus and minus symmetric orders in the case of binary kinoforms. Moreover, the kinoform can be represented with a reduced quantisation error resulting in lower noise in the replay field. Higher information content in the kinoform results in higher fidelity reconstruction.

Computation of Kinoforms in Real Time.

Figure 10:
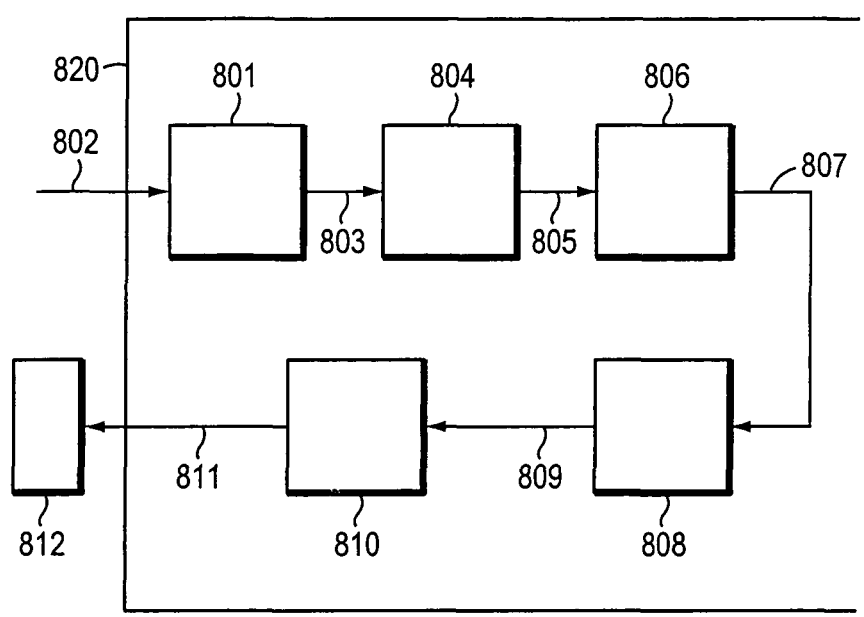
FIG. 10 shows a block schematic drawing of processor components according to the invention.

The manner in which the apparatus described above can be utilised to produce real time video holographic projection will now be described. In a first method embodiment, referring to FIG. 10, a signal (802) representing an m×m pixel input intensity field $T_{xy}$, generated directly from a video signal is input to the processor (820) having a first processing block (801). The processing device (20) in this embodiment includes a field programmable gate array (FPGA) running code to enable it to perform the required functions. In other embodiments an ASIC is used and in yet others a programmed general purpose computer is used. The first processing block (801) for each said plurality of pixellated holograms, forms a first data set $T_{xy}^{(n)}$ at an output (803) by the expression $T_{xy}^{(n)} = \sqrt{T_{xy}}\exp(j\Phi_{xy}^{(n)})$ so that the first data set $T_{xy}^{(n)}$ has amplitude equal to the amplitude of the desired pixel and identically distributed (i.i.d.) uniformly random phase.

The first data set (803) is applied to a second processing block (804) which forms a second data set $G_{xy}^{(n)}$ such that $G_{xy}^{(n)} = F^{-1}[T_{xy}^{(n)}]$ at output (5) where $F^{-1}$ represents the 2D inverse Fourier transform.

The second data set is then shifted by third processing block (806) in the real direction in the complex plane (i.e. to the right) sufficiently to form a third data set (807) in which the phase of each data point is small. The third processing block (806) forms R as the smallest positive real such that $|G_{xy}^{(n)}| \leq R$ ∀x, y, n, and adds a real α where α>>R to each data item of the second set to form a third set $\alpha + G_{xy}^{(n)}$ at output (807)

The third data set at output (807) is applied to a magnitude-forming fifth processing block (808) performing the function $M_{xy}^{(n)} = |\alpha + G_{xy}^{(n)}|$ such that $M_{xy}^{(n)}$ is output as a fourth data set (809).

The fourth data is then supplied to a binarisation stage (810) performing the function $$H_{xy}^{(n)} = \begin{cases} -1 & \text{if } M_{xy}^{(n)} < Q^{(n)} \\ 1 & \text{if } M_{xy}^{(n)} \geq Q^{(n)} \end{cases}$$

where $Q^{(n)} = \text{median}(M_{xy}^{(n)})$ to form a fifth data set (811) for display as a said hologram.

The fifth data set (11) is supplied to a ferroelectric liquid crystal SLM (12) for display and viewing. Although a ferroelectric liquid crystal spatial light modulator is used in this embodiment other devices, for example including nematic SLMs, OASLMs (optically-addressed spatial light modulators), and also more exotic types of liquid crystal displays such as electroclinic, pi cell, flexoelectric, antiferroelectric, ferrielectric, V-shaped switching cells, and guest-host dye cells may be substituted, in addition to non-liquid crystal technologies such as MEMS devices such as DMDs. The device may be transmissive or reflective.

The presence of only a single computationally intensive step, i.e. the inverse Fourier transform, allows current hardware to generate in real time plural, e.g. 40, holograms per video frame.

In a second method embodiment, a modified process generates sets of 2N distinct m×m binary phase holograms $H_{xy}^{(n)}$, each of which produces a replay field that approximates the same target image. The key feature of the process is that the noise fields produced by each hologram are i.i.d., satisfying the conditions above.

The process begins with the specification of a target intensity image $T_{xy}$ and proceeds as follows:
1. Let $T_{xy}^{(n)} = \sqrt{T_{xy}}\exp(j\Phi_{xy}^{(n)})$ where $\Phi_{xy}^{(n)}$ is uniformly distributed between 0 and $2\pi$ for $1 \leq n \leq N$, $1 \leq x, y \leq m$
2. Let $G_{xy}^{(n)} = F^{-1}[T_{xy}^{(n)}]$ where $F^{-1}$ represents the 2D inverse Fourier transform operator, for $1 \leq n \leq N$
3. Let $M_{xy}^{(n)} = \Re\{G_{xy}^{(n)}\}$ for $1 \leq n \leq N$
4. Let $M_{xy}^{(n+N)} = \Im\{G_{xy}^{(n)}\}$ for $1 \leq n \leq N$
5. Let $$H_{xy}^{(n)} = \begin{cases} -1 & \text{if } M_{xy}^{(n)} < Q^{(n)} \\ 1 & \text{if } M_{xy}^{(n)} \geq Q^{(n)} \end{cases}$$

where $Q^{(n)} = \text{median}(M_{xy}^{(n)})$ and $1 \leq n \leq 2N$

Steps 3 and 5 of this process are exactly equivalent to steps 3, 4 and 5 of the first embodiment, but an additional step (number 4 in this process) is added. The holograms $M_{xy}^{(n)}$ produced here are thus exactly the same as the holograms $M_{xy}^{(n)}$ produced by the original algorithm, only here the holograms $M_{xy}^{(n+N)}$ are also provided "for free"—i.e. without a need for further Fourier transform step.

Step 1 forms N targets $T_{xy}^{(n)}$ equal to the amplitude of the supplied intensity target $T_{xy}$, but with i.i.d. uniformly-random phase. Step 2 computes the N corresponding full complex Fourier transform holograms $G_{xy}^{(n)}$. Steps 3, 4 compute the real part and imaginary part of the holograms, respectively. Binarisation of each of the real and imaginary parts of the holograms is then performed in step 5: thresholding around the median of $M_{xy}^{(n)}$ ensures equal numbers of −1 and 1 points are present in the holograms, achieving DC balance (by definition) and also minimal reconstruction error. Hence, for one Fourier transform operation performed upon $T_{xy}$, two binary phase holograms $H_{xy}$ are provided as opposed to one hologram obtained using the process of the first embodiment.

Any purely real hologram (such as a binary phase hologram) produces a conjugate image in the replay field, reducing the usable area and hence the efficiency by half.

The conjugate image can be removed by generating a four-phase hologram where each pixel takes one of the values [1,j,−1,−j], although such holograms cannot be displayed on an inherently binary device such as a ferroelectric SLM. More than two phase levels can be displayed on a nematic liquid crystal device, but these are currently orders of magnitude too slow for high frame-rate applications, as provided by the algorithm described above.

However by etching a pixellated phase mask of pixel values 1 and j (thus imposing phase shifts of 0 and π/2 respectively) on the top surface of a binary-phase SLM the conjugate image can be removed. This is achieved by randomly setting the pixel values of the mask such that the net modulation imposed by the combination of the SLM and phase mask lie in the set [1,j,−1,−j], which provides the extra degree of freedom required to remove the conjugate image (at the expense of additional RPF noise), despite the fact that the SLM itself is binary. This technique has been used in correlator design and is here applied to the display application. Although the pixel values of the mask are random, and thus have "dc balance" in that there are statistically equal numbers of each value of phase shift, the mask itself is fixed and the pixel position of each value of phase shift is known.

In other embodiments, a distribution of phase shifts that is not completely random is used.

To modify the algorithm described above to use a phase mask, the second block (4) is modified to provide a $G_{xy}^{(n)}$ such that $$G_{xy}^{(n)} = \frac{F^{-1}[T_{xy}^{(n)}]}{P_{xy}}$$

where $P_{xy}$ defines the phase mask, which has been generated randomly so that each pixel has an equal probability of taking the value 1 or j.

To evaluate the efficacy of this technique in simulation, holograms were generated for the two test patterns with each hologram being replicated twice, the replication step being performed between steps 2 and 3 in the algorithm. The replay fields formed demonstrated that the conjugate image is removed effectively, and simulations also show that the use of the phase mask does not significantly degrade the signal-to-noise ratio of the RPF produced.

The foregoing discussion relates to producing desired 2D structure in the far field using Fourier holograms. The method can also be extended to produce Fresnel holograms for the production of structure in the near field, which is particularly useful for a lensless optical configuration. As discussed above, Fresnel holography offers a further advantage of enabling lensless projection, since the hologram itself encodes the focussing element, giving an obvious weight, cost and size saving over conventional projective display systems.

The discrete Fresnel transform is closely related to the Fourier transform, and describes the near field $T_{xy}$ produced at distance f by the hologram $G_{xy}$ (of dimensions X by Y and corresponding pixel sizes $\Delta_x$ and $\Delta_y$) when illuminated with coherent light of wavelength λ. When imaging not too close to the hologram the transform is given by $$T_{xy} = \frac{j}{\lambda f} \exp\left(-j\pi\lambda f\left[\frac{x^2}{X^2\Delta_x^2} + \frac{y^2}{Y^2\Delta_y^2}\right]\right) \times F\left[G_{xy}\exp\left(\frac{-j\pi}{\lambda f}(x^2\Delta_x^2 + y^2\Delta_y^2)\right)\right]$$

with corresponding inverse transform $$G_{xy} = \exp\left(\frac{j\pi}{\lambda f}(x^2\Delta_x^2 + y^2\Delta_y^2)\right) \times F^{-1}\left[T_{xy}\frac{\lambda f}{j}\exp\left(j\pi\lambda f\left[\frac{x^2}{X^2\Delta_x^2} + \frac{y^2}{Y^2\Delta_y^2}\right]\right)\right]$$

Hence if processing block (4) provides a $G_{xy}^{(n)}$ such that $$G_{xy} = \exp\left(\frac{j\pi}{\lambda f}(x^2\Delta_x^2 + y^2\Delta_y^2)\right) \times F^{-1}\left[T_{xy}\frac{\lambda f}{j}\exp\left(j\pi\lambda f\left[\frac{x^2}{X^2\Delta_x^2} + \frac{y^2}{Y^2\Delta_y^2}\right]\right)\right]$$

Fresnel holograms are generated that form the target image at the specified distance f from the hologram.

The techniques described may be modified for the generation of 3D holograms for 3D holographic video display. A 3D hologram of an object is simply a recording of the complex electromagnetic field (produced by light scattered by the object) at a plane in front of the object. By Huygens' principle, if the EM field distribution on a plane P is known, Huygens wavelets can be propagated through space to evaluate the field at any point in 3D space. As such, the plane hologram encodes all the information necessary to view the object from any position and angle in front of the plane and hence is, in theory, optically indistinguishable from the object. In practice, limitations in the pixel resolution of the recording medium restricts the viewing angle θ which, as in the 2D case, varies inversely with the pixel size Δ

Consider a plane, perpendicular to the z-axis, intersecting the origin, and one point source emitter of wavelength λ and amplitude A at position (X, Y, Z) behind it. The field F present at position (x, y) on the plane—i.e. the hologram—is given by $$F(x, y) = \frac{ZA}{j\lambda r^2}\exp\left(\frac{2\pi j}{\lambda}r\right) \text{ with } r = \sqrt{(x-X)^2 + (y-Y)^2 + Z^2}$$

If a 3D scene is regarded as M sources of amplitude $A_i$ at $(X_i, Y_i, Z_i)$, the linear nature of EM propagation results in the total field hologram F being $$F(x, y) = \sum_{i=1}^{M} \frac{Z_i A_i}{j\lambda r_i^2} \exp\left(\frac{2\pi j}{\lambda} r_i\right) \text{ with } r_i = \sqrt{(x-X_i)^2 + (y-Y_i)^2 + Z_i^2}$$

If $F(x, y)$ is to be sampled over the region $x_{min} \leq x \leq x_{max}$, $y_{min} \leq y \leq y_{max}$ to form an m×mm hologram $F_{xy}$, there is obtained:

$$F_{xy} = \sum_{i=1}^{M} \frac{Z_i A_i}{j\lambda r_i^2} \exp\left(\frac{2\pi j}{\lambda} r_i\right)$$

with $$r_i = \sqrt{\left(x_{min} + x\frac{x_{max}-x_{min}}{m} - X_i\right)^2 + \left(y_{min} + y\frac{y_{max}-y_{min}}{m} - Y_i\right)^2 + Z_i^2}$$

There is thus presented an algorithm (with an SLM phase mask) that generates N full-parallax 3D holograms $H_{xy}^{(n)}$ for a given array of point sources, as above.

Let $$F_{xy}^{(n)} = \sum_{i=1}^{M} \frac{Z_i A_i}{j\lambda r_i^2} \exp\left(\Phi_i^{(n)} j + \frac{2\pi j}{\lambda} r_i\right)$$

with $r_i$ as above where $\Phi_i^{(n)}$ is uniformly distributed between 0 and $2\pi$ for $1 \leq n \leq N$, $1 \leq i \leq M$ Let $$G_{xy}^{(n)} = \frac{F_{xy}^{(n)}}{P_{xy}},$$

where $P_{xy}$ is the precomputed [1,j] phase mask as described in the previous section Let R be the smallest positive real such that $|G_{xy}^{(n)}| \leq R$ $\forall x,y,n$. R exists since each value taken by $G_{xy}^{(n)}$ is finite and so $G_{xy}^{(n)}$ has compact support Let $M_{xy}^{(n)} = |\alpha + G_{xy}^{(n)}|$, where $\alpha$ is real and very much greater than R.

Let $$H_{xy}^{(n)} = \begin{cases} -1 & \text{if } M_{xy}^{(n)} < Q^{(n)} \\ 1 & \text{if } M_{xy}^{(n)} \geq Q^{(n)} \end{cases}$$

where $Q^{(n)} = \text{median}(M_{xy}^{(n)})$

To test this algorithm, there is considered the calculation of N=8 holograms of resolution 512×512 and size 2 mm×2 mm centred at the origin of plane P, giving a pixel size of $\Delta=4$ μm and hence a viewing angle of around 9 degrees under coherent red illumination ($\lambda=632$ nm). The 3D scene used was a set of 944 point sources that formed a wireframe cuboid of dimensions 12 cm×12 cm×18 cm, located at a distance of 1.91 m from the plane.

The simulated RPFs produced were calculated by propagating Huygens wavelets from the N holograms in turn through a pinhole aperture K onto a virtual screen (a plane perpendicular to the line from the centre of the cube to the pinhole), and recording the time-averaged intensity distribution on the screen.

Unfortunately, in contrast with algorithm described for 2D, the computation of step one in the 3D algorithm above may not be realisable in real time with current consumer hardware for a scene with anything but a very small number of point sources. However, the required holograms generated by the algorithm can be computed and stored for recall in real time. Much more powerful computation may be needed for real-time three-dimensional hologram generation, although it has been found possible to optimise the calculations in a way that suggests that such computation may not be needed.

The holographic projection method detailed above is realisable in hardware. At the time of writing, commercially available FPGAs (field programmable gate arrays) can be programmed using commercially available code to compute 512×512 Fourier transforms at a rate of at least 2400 frames/sec, sufficient for full-colour video (25 frames/sec, 3 colour planes, N=32). For the display device, a commercially available SLM can display a sufficient frame rate at at least 512×512 resolution. It is possible to use separate illumination devices where multiple colours are needed—for example for a full colour display. Alternatively a single device capable of multiple colour output can be used instead.

Two significant design issues have been identified.

Firstly, since optical loss in the phase holographic element is small and total energy is conserved, nearly all of the incident optical energy is routed into the RPF. Therefore, a target RPF with fewer "on" points will appear brighter than one with many, assuming total energy is distributed approximately evenly between each "on" pixel in the RPF. As a result, a controller causes the intensity of the source to be modulated correspondingly to achieve a uniform overall brightness between frames, in accordance with the number of "on" points in each frame. Direct amplitude modulation of a laser is undesirable due to nonlinearity, and thus in an embodiment such amplitude modulation is replaced by pulse-width modulation within each 400 μs pulse interval with a duty cycle proportional to the desired brightness to achieve the required average intensity.

Secondly, a design issue comes from the relationship between RPF size and illumination wavelength. This is overcome in one embodiment by a lens system corrected for chromatic aberration at the three wavelengths of the sources and in another by using Fresnel holography to build compensation for this effect directly into the holograms.

The results of the approach of the invention show in simulation a RPF exhibiting a noise energy of two orders of magnitude lower than DBS, with calculation times six orders of magnitude faster. Experimental results are in agreement with the theory, and show a previously undemonstrated level of contrast and accuracy for a holographically generated image even with a test device that is a very old design of ferroelectric SLM.

An alternative class of algorithms that can utilise the hard wired fast Fourier transform processors are directional iterative optimisation algorithms such as the Gerchberg Saxton algorithm. These are discussed in more detail below and belong to the class collectively known as ping-pong algorithms also including, for example, IFTA, input/output algorithms of the type known to the skilled person. In such algorithms the start point is a random phase distribution or other deterministic phase distribution, for example, some pre-determined phase distribution which is binarised and a Fast Fourier Transform (FFT) performed thereon to give an improved phase distribution replacing the initial phase distribution. The cycle is reiterated until the FFT binarised phase distribution approximates to a desired target distribution. Alternatively, the random phase distribution generally assumed at the start of the GS algorithm can be replaced with a phase distribution inherited from a previous frame.

This is particularly of interest when attempting to minimise the number of iterations necessary to achieve a good kinoform. When the video frame comprises a sequential series of sub-frames, this is also true of the sub-frames.

Alternatively algorithms such as uni-directional iterative optimisation algorithms (single pixel change and cost function testing) such as direct binary search and simulated annealing can be implemented, which techniques are once again well known to the skilled reader and are not described in detail here.

The kinoform can be generated in real time in a range of manners and alternative improved manners will now be described. As discussed above, it is desirable to generate holograms in M×real-time, where M represents the temporal multi-plexing factor for noise reduction and also for greyscale/colour representation as discussed in more detail below. Algorithm implementation can be accelerated in a range of manners.

In a first approach comprising hologram segmentation, an initial unoptimised hologram is sub-divided into equal areas, which are independently optimised according to an algorithm described herein in parallel. As the processing time is proportional to the square of the number of pixels in many instances, this correspondingly reduces the processing time distributed amongst parallel processors. In addition to spatial segmentation the hologram can be decomposed in any appropriate manner.

Yet further, quantisation procedures such as error-diffusion and projection onto constrained sets (POCS) may be applied after a complex hologram has been defined, again as well known to the skilled reader. In all cases it will be appreciated that following segmentation or other decomposition of the hologram to optimise parallel processing, the decomposed parts are summed to give a fully reconstructed image.

All these algorithms can be implemented and speeded up by using dedicated hardware in the processor for carrying out the optimisations, for example an FFT processor, FPGA (field programmable gate array) board, DCT processor (discrete cosine transform), or DSP (digital signal processing) board, of any appropriate known type.

Modulation Schemes and Kinoform Generation.

It will be appreciated further that various possible modulation schemes can be implemented for representing the kinoform on the SLM, using binary or multi-level quantisation as discussed above. In particular modulation schemes can be adopted such that reconstruction of a hologram under sequential red, green, and blue illumination gives a coloured grey scale image.

According to a direct modulation scheme, the SLM is directly modulated to provide colour and/or grey scale. In particular fast SLM devices are used to provide frame sequential multiplexing of binary or multi-level holograms to provide enhanced grey scale and frame sequential colour and, as discussed in more detail below, potential for noise reduction. Alternatively the illumination source can be modulated and the SLM can use holograms which replay to binary bit planes such that the light modulation dwell time or light intensity varies according to the significance of the bit plane, for example following a Frame Sequential Grey Scale (FSGS) scheme. Alternatively again, according to a Frame Sequential Colour (FSC) scheme, the display can adopt a modulation scheme employing sequential illumination of red, green, blue (RGB) or other colour scheme light emitting diodes (LEDs) rather than a white light source in which case these are synchronised with holograms dedicated to a given colour. Schemes such as these are well known to the skilled reader and are not described in detail here.

Additionally, it is desirable to reduce noise in the projected or displayed image. The sources of noise can be categorised as systematic and non-systematic. Systematic sources include phase representation errors and non-uniformity in the SLM. Non-systematic sources include noise arising from implementation of an optimisation algorithm, and binarisation errors. As discussed above, use of multi-level quantisation on the SLM reduces binarisation noise significantly and also reduces the noise introduced by optimisation algorithms as the constraints on the algorithm are reduced providing a great search space. Yet further multi-level quantisation reduces noise from phase representation errors. In addition noise averaging or noise cancellation techniques are employed where noise averaging spreads the effect of noise at the cost of a reduction in contrast whereas noise cancellation reduces noise without contrast reduction but with an increased processing burden.

A first noise averaging approach comprises the algorithm described in more detail above in which a series of sub-frames with independent noise fields provide reduced noise. An alternative approach is to implement an iterative optimisation algorithm such as the above-mentioned Gerchberg Saxton algorithm taking some or all of the iterations as sub-frames. Each sub-frame displays statistical noise independence such that displaying the sub-frame sequentially provides noise reduction. The skilled reader will be fully familiar with implementation of the Gerchberg Saxton algorithm. In particular it will be seen that each sub-frame is the result of a single iteration or "pass" of the algorithm based on a phase distribution generated by a previous pass. It will be seen that the algorithm can be used to generate sub-frames with each iteration being displayed between sub-frames to provide sub-frame-level noise reduction, or the iterations can be used to generate frames and displayed between frames in a similar manner. Sequential bit-planes and colour sub-frames may be used for the purpose of inheriting phase distributions, providing a better result than assuming a random phase distribution for each sub-frame. If sub-frames are used for other purposes (eg because they facilitate the computation of the holograms) then this principle might also be applied in this case.

Alternatively again, noise averaging can be achieved by averaging over sequential decompositions of the total replay image. For example the image can be decomposed by colour, as discussed above, and multiplexed or summed to give the full image in which case there will be noise reduction. Alternative sub-frame sequential bit planes can be implemented or indeed any group of subsets of the full set of pixels can be used to give the total image, but sequentially represented to provide noise averaging.

Generally when projecting such sequential frames to produce a video image noise averaging occurs. This reduces the visible impact of any noise present in individual the frames. This is true whether the frames are generated from kinoforms or not, but it is particularly beneficial when they are (due to level of noise usually present within each frame in this case). It is even truer if the frames are composed of sequentially presented sub-frames since the noise is now averaged over both frames and sub-frames, and optimised results in achieving the best quality computer generated kinoform by minimising the amount of noise in image frames or sub-frames and maximising their efficiency when projected, where multilevel quantised frames or sub-frames are generated.

An example of the way in which this might be implemented for a first frame or subframe comprises the steps:
1) Assume random phase distribution over all the real pixels in the real image.
2) Take the full Discrete Fast Fourier Transform (FFT).
3) Reject the real part and take the FFT of the imaginary part.
4) This gives a first iteration of the real image (which we will reject) along with an improved phase distribution to associate with it called P1.
5) Take the FFT of real image plus the new imaginary part.
6) Reject the real part. The imaginary part is now accepted as the phase hologram for frame 1.

For the next frame or subframe, this is likely to be very similar to the first. Hence the phase distribution P1 is now associated with the next frame, and the FFT is taken using the real next frame and P1.

This can be continued for a number of frames on the assumption that it is likely that the frames are similar.

At intervals the whole process is continuously repeated by returning to step 1 (but in general it may not be necessary to use a random phase distribution when re-starting the sequence, as any inherited phase distribution may be just as good).

One reason for repeating the sequence may be because eventually the scene will change and the inherited phase distribution will be no longer applicable, so it needs regenerating in steps 2 and 3.

Alternatively the process may be repeated back to step 1 more frequently than this so that the inherited phase distribution is continuously improved, even if the scene does not change substantially. Thus in general the process would be repeated back to step 1 as often as is possible, the limiting feature being the time required to carry out the Fast Fourier Transforms.

This is particularly of interest when attempting to minimise the number of iterations necessary to achieve a good kinoform. The same principle might be applied to some kinds of sub-frames that might be projected in sequence to make up each full video frame. Examples of such sub-frames might include red, green and blue sub-frames in frame sequential colour projection systems (which are integrated by the eye to give a full colour image). They may also include the (binary) bit planes that may be projected in sequence to achieve a grey-level image (e.g. for each colour). In this case appropriate binary weighting is provided to each bit plane on projection by changing the intensity of the projection light source.

The kinoform calculated as above or otherwise will be improved if the if multiple periodic copies of the kinoform are illuminated by the projector laser light source rather than just one copy.

In the case of noise cancellation, the hologram generated can be of higher resolution than the target image. This can result in a quasi-periodic pattern being introduced as a result of the kinoform optimisation algorithm, each pattern having slightly different features to its neighbours, giving rise to noise reduction.

A further alternative noise cancellation technique comprises spatial multiplexing of a hologram or a set of holograms on the SLM, or multiplexing a single hologram spatially onto an OASLM. This once again provides more pixels in the kinoform which enhances replay quality. One such approach is described in L. B. Lesem, P. M. Hirsch, J. A. Jordan, "Computer synthesis of holograms for 3-D display", Commun. ACM, 11, 661-674 (1968). For example it will be appreciated that the sub-frames generated as described above, can be spatially multiplexed, i.e. the respective sub-frames can be juxtaposed on an OASLM and then be recombined as a single frame providing yet further enhanced noise reduction and image quality.

Yet a further approach particularly applicable to systematic sources of noise comprises appropriate shaping of the beam wavefront from the illumination source to compensate for known systematic errors. Those errors can be identified in a calibration stage and appropriate waveform shaping optics implemented accordingly.

It will be appreciated that the individual components of the embodiments described above can be any appropriate optical or other elements. For example the processing device includes a field programmable gate array (FPGA) running code to enable it to perform the required functions. In other embodiments an ASIC is used and in yet others a programmed general purpose computer is used. The LCOS can comprise a modulatable pixel array driven by a separate processor. In an alternative configuration, the processing hardware can be incorporated into the LCOS back plane providing a fully intergrated device simply requiring a video input.

As a result of the embodiments described above, a fast, reduced noise, real-time video holographic projector with highlight efficiency and image quality is provided.

Figure 11:
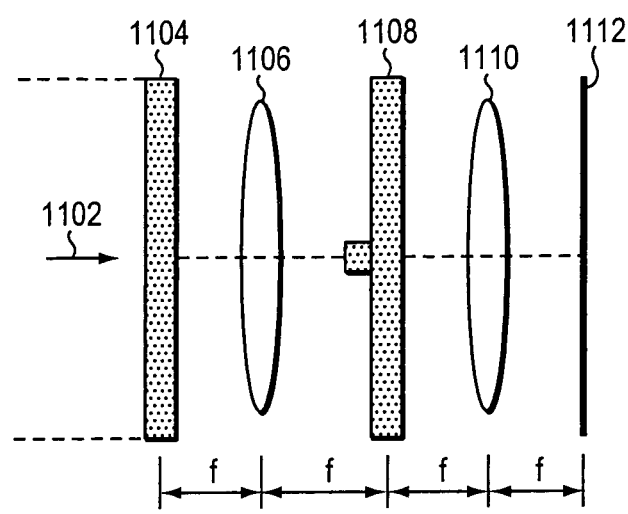
FIG. 11 is a schematic drawing showing components of a seventh embodiment of the invention.

According to yet a further embodiment of the invention lossless light projection is achieved using a phase-only image as shown in FIG. 11. A collimated light beam 1102 illuminates a phase-only SLM 1104 which shows a phase modulated, direct (non-holographic) representation of the image. The phase modulated output beam is focused by optics 1106 onto a phase contrast filter 1108 at the Fourier plane which is then focused via further optics 1110 onto an image plane 1112. As a result, if a phase image of the object is presented on the SLM, then projection via the 4f imaging system shown provides an amplitude modulated image with high throughput efficiency. Any appropriate spectrally sharp, narrow band illumination can be provided and as coherency is not required, alternative light sources to a laser may be used, which reduces noise arising from speckle. In the preferred embodiment, multi-level modulation is implemented to provide a grey scale image.

It will be appreciated that the embodiments described above can be used in any display or projection application including rear and front projection, and in relation to any regularly refreshed image in particular where real-time processing of a corresponding sequence of kinoforms is desired.

It will be appreciated that in the above description, the use of the term "pixel" covers any appropriate modulatable and addressable element of any shape or distribution. It is not intended herein, when the term "pixel" is used, that any directly viewable picture content is to be seen on the elements concerned.

It will be appreciated that the invention extends to a computer program product implementing the processing steps, any computer or processor implementing those steps and any computer readable medium storing or otherwise capable of providing the computer program, for example as a media storage device such as a CD-ROM, or in wired or wireless downloadable form from a remote server computer.

What is claimed is:

1. A method of projecting a 2-D video image onto a screen, the projected 2-D video image being made up of sequential image frames at a video frame rate, the method comprising:
   receiving an input video image made up of video frames at a processor;
   in the processor, processing each input video frame in real-time to obtain quantised data representative of one or more respective phase-only kinoforms;

writing the quantised data representative of one or more respective phase-only kinoforms to a reflective pixellated LCOS phase-only spatial light modulator to sequentially represent each said kinoform;

illuminating the reflective pixellated LCOS phase-only spatial light modulator with visible light from an illumination source to provide a phase modulated output beam;

processing the phase modulated output beam from the reflective pixellated LCOS phase-only spatial light modulator by optics to reconstruct the sequential image frames across the screen at a replay field in real-time for viewing the 2-D video image, wherein the optics comprises a Fourier transform lens; and controlling the intensity of the illumination source to achieve a desired image brightness from frame to frame.

2. A method as claimed in claim 1 in which the video image is one of a time varying or still image.

3. A method as claimed in claim 1, further comprising parallel processing respective sub-sets of an initial kinoform to obtain optimised sub-sets and recombining the optimised sub-sets.

4. A method as claimed in claim 3, in which the initial kinoform sub-sets comprise initial kinoform segments.

5. A method as claimed in claim 3, in which the initial kinoform is randomly generated or pre-determined or the result of an initial FFT, or a recycled phase distribution.

6. A method as claimed in claim 1, in which image frames are processed to obtain a respective kinoform using any one of a bi-directional iterative optimisation algorithm, a uni-directional iterative optimisation algorithm or a bi-directional iterative quantisation procedure, or a uni-directional non-iterative procedure.

7. A method as claimed in claim 1, further comprising controlling a parameter of operation to provide at least one of grey scale and colour.

8. A method as claimed in claim 7, in which the spatial light modulator is directly modulated to provide colour and/or grey scale.

9. A method as claimed in claim 8, in which the spatial light modulator provides a binary quantisation scheme and is multiplexed frame sequentially to provide colour and/or grey scale.

10. A method as claimed in claim 8, in which the spatial light modulator provides a multi-level quantisation scheme to provide colour and/or grey scale.

11. A method as claimed in claim 7, in which the illumination source is modulated in the time domain to provide colour and/or grey scale.

12. A method as claimed in claim 7, in which the illumination source is modulated in the colour domain to provide colour and/or grey scale.

13. A method as claimed in claim 1, in which the kinoform obtained comprises one of a plurality of kinoforms which each reconstruct a spatial, colour or intensity decomposition of the image frame.

14. A method as claimed in claim 13, in which the plurality of kinoforms sum to give the real image.

15. A method as claimed in claim 1, further comprising a noise reduction step, in which noise reduction is provided by programming the spatial light modulator to represent the kinoform according to a multi-level quantisation scheme.

16. As method as claimed in claim 15, in which additional noise reduction is provided by noise averaging over a plurality of image frames.

17. A method as claimed in claim 6, in which the optimisation algorithm is based on the Gerchberg Saxton algorithm.

18. A method as claimed in claim 15, in which the image frame and kinoform are pixellated, and wherein the kinoform contains excess pixels in relation to the image frame.

19. A method as claimed in claim 15, in which additional noise reduction is provided by spatial multiplexing of each phase hologram.

20. A method as claimed in claim 19, in which the phase holograms are spatially multiplexed on the spatial light modulator.

21. A method as claimed in claim 19, in which the phase holograms are spatially multiplexed on an optically addressable spatial light modulator.

22. A method as claimed in claim 20, in which each image frame comprises a plurality of sequential image sub-frames and the spatial multiplexing step comprises juxtaposing sequential sub-frames.

23. A method as claimed in claim 15, in which additional noise reduction is provided by shaping an illumination source wave front to mitigate systematic noise.

24. A method as claimed in claim 1, further comprising spatially multiplexing the kinoform on one of the spatial light modulator or an optically addressable spatial light modulator.

25. A projector for projecting a 2-D video image onto a screen, the projected 2-D video image being made up of sequential image frames at a video frame rate, the projector comprising:

a processor, a reflective pixellated LCOS phase-only spatial light modulator and an illumination source for illuminating the reflective pixellated LCOS phase-only spatial light modulator with visible light, the processor having an input for receiving an input video image made up of video frames and an output for writing data to the reflective pixellated LCOS phase-only spatial light modulator, the processor being arranged to:

process each image frame in real-time to obtain quantised data representative of one or more respective phase-only kinoforms; and write the quantised data representative of one or more respective phase-only kinoforms to the reflective pixellated LCOS phase-only spatial light modulator to sequentially represent each said kinoform;

the illumination source arranged to illuminate the reflective pixellated LCOS phase-only spatial light modulator with visible light to provide a phase-modulated output beam, the projector further comprising optics to reconstruct the sequential image frames across the screen in real-time for viewing the 2-D video image, wherein the optics comprises a Fourier transform lens; and a controller arranged to control the intensity of the illumination source to achieve a desired image brightness from frame to frame.

26. A projector as claimed in claim 25, in which the processor includes at least one of an FFT processor, a field programmable gate array processor or a digital signal processor.

27. A projector as claimed in claim 25, in which the illumination source is a partially coherent illumination source.

28. A projector as claimed in claim 27, in which the illumination source is arranged to be modulated to provide colour and/or grey scale.

29. A projector as claimed in claim 27, further comprising illumination source wave-front shaping optics arranged to shape an illumination beam to mitigate systematic noise in the display.

30. A projector as claimed in claim 27, further including an optically addressable spatial light modulator (OASLM).

31. A projector as claimed in claim 30, further comprising spatial multiplexing optics arranged to spatially multiplex the kinoform onto the OASLM.

32. A projector as claimed in claim 31, in which the spatial multiplexing optics are further arranged to spatially multiplex temporally varying kinoform.

33. A projector as claimed in claim 27, further comprising a display screen.

34. A projector as claimed in claim 33, in which the display screen is located optically off-axis.

35. A projector as claimed in claim 25 in which the video image comprises at least one of a time varying and still image.

36. A projector as claimed in claim 25 in which the spatial light modulator provides binary quantisation.

37. A projector as claimed in claim 36, in which the spatial light modulator includes one or more modulating elements.

38. A projector as claimed in claim 25 in which the spatial light modulator provides multi-level quantisation.

39. A projector as claimed in claim 25 in which the spatial light modulator includes, as a programmable component, any one of nematic liquid crystal on silicon (LCOS), electroclinic LCOS, deformed helix LCOS and V-shaped switching LCOS.

40. A projector as claimed in claim 25 wherein the optics further comprise projection optics associated with the spatial light modulator.

41. A projector as claimed in claim 25 in which projection optics are programmed into the kinoform.

42. A projector as claimed in claim 25 wherein the controller is arranged to control the intensity dependent on image content.

43. A method as claimed in claim 1 further comprising a noise reduction step.

44. A method as claimed in claim 43 in which noise reduction is provided by noise averaging over a plurality of sub-frames of each image frame.

45. A method as claimed in claim 44 in which each sub-frame is generated in an optimisation algorithm.

46. A method as claimed in claim 1 wherein controlling the intensity is dependent on image content.

* * * * *